United States Patent
Kreft

Patent Number: 6,029,496
Date of Patent: Feb. 29, 2000

[54] METHOD AND DEVICE FOR AUTOMATIC CALIBRATION OF AN ODOMETER

[75] Inventor: Peter Kreft, Hannover, Germany

[73] Assignee: Robert Bosch GmbH, Stuttgart, Germany

[21] Appl. No.: 09/269,142

[22] PCT Filed: Jun. 21, 1997

[86] PCT No.: PCT/DE97/01296

§ 371 Date: Mar. 16, 1999

§ 102(e) Date: Mar. 16, 1999

[87] PCT Pub. No.: WO98/12505

PCT Pub. Date: Mar. 26, 1998

[30] Foreign Application Priority Data

Sep. 16, 1996 [DE] Germany .......................... 196 37 616

[51] Int. Cl.⁷ .................................................. G01P 21/00
[52] U.S. Cl. .................................................... 73/1.37
[58] Field of Search .............................. 702/96; 73/1.37, 73/1.41

[56] References Cited

U.S. PATENT DOCUMENTS 5,569,848 10/1996 Sharp .
5,917,434 6/1999 Murphy .

FOREIGN PATENT DOCUMENTS

WO 94 28435 12/1994 WIPO .

OTHER PUBLICATIONS

*Odometer Calibration*, Research Disclosure, No. 364, p. 448, XP000468978.

*Primary Examiner*—Robert Raevis
*Attorney, Agent, or Firm*—Kenyon & Kenyon

[57] ABSTRACT

A location system for a motor vehicle in which the calibration of a displacement sensor is performed with the aid of satellite signals. A Global Positioning System (GPS) receiver may be used, and the current vehicle speed within a time segment is calculated using the Doppler method. The distance traveled is ascertained from the vehicle speed. By taking a mean, calculating the dispersion, and performing a weighting, a very accurate reference value for calibration of the displacement sensor is achieved.

8 Claims, 1 Drawing Sheet

METHOD AND DEVICE FOR AUTOMATIC CALIBRATION OF AN ODOMETER

FIELD OF THE INVENTION

The present invention relates to a method and an apparatus for automatic calibration of a displacement sensor.

BACKGROUND INFORMATION

In a conventional vehicle navigation system, the calibration of the length measurement of a wheel sensor is based upon driving along a path of known distance. This calibration method requires, however, that the length of the calibration path be exactly known and that the path be driven along exactly (from beginning to end), in order to minimize length measurement errors. This procedure is necessary after initial installation of the navigation system in the vehicle, or when a tire change is made (such as, for example, after a changeover from summer to winter tires, or from old to new tires). In the situations described above, it is therefore necessary to have the displacement sensor length measurement calibrated at the repair shop.

SUMMARY OF THE INVENTION

The present invention provides a method for automatic calibration of a displacement sensor. The method is advantageous in that automatic calibration of the displacement sensor, for example in the event of a tire change, eliminates the need for laborious manual calibration. Costs are thereby reduced.

The method is further advantageous in that the displacement sensor is optimally calibrated regardless of vehicle load, tire pressure, or the like. Dead reckoning location thereby advantageously becomes more reliable.

The present invention also provides for the determination of vehicle speed by receiving satellite signals such as, for example, those transmitted from the Global Positioning System (GPS) system. At a given speed, the vehicle travels a defined distance within a predefined time period. The speed can, in this context, advantageously be measured using the Doppler effect. The distance traveled can then be calculated from the speed.

Even if the GPS data contain a certain error, the present invention contemplates the elimination of systematic error through mathematical techniques. It is, for example particularly favorable to determine the mean from a plurality of measurements, excluding those values which lie outside a predefined dispersion range. It appears advantageous in this context to take the standard deviation $\sigma$ as a basis for the dispersion range.

Using the mean and the standard deviation $\sigma$, the length measurement of an inductive wheel sensor or of a signal from the speedometer sensor can be calibrated within a predefined accuracy.

DETAILED DESCRIPTION

Figure 1:
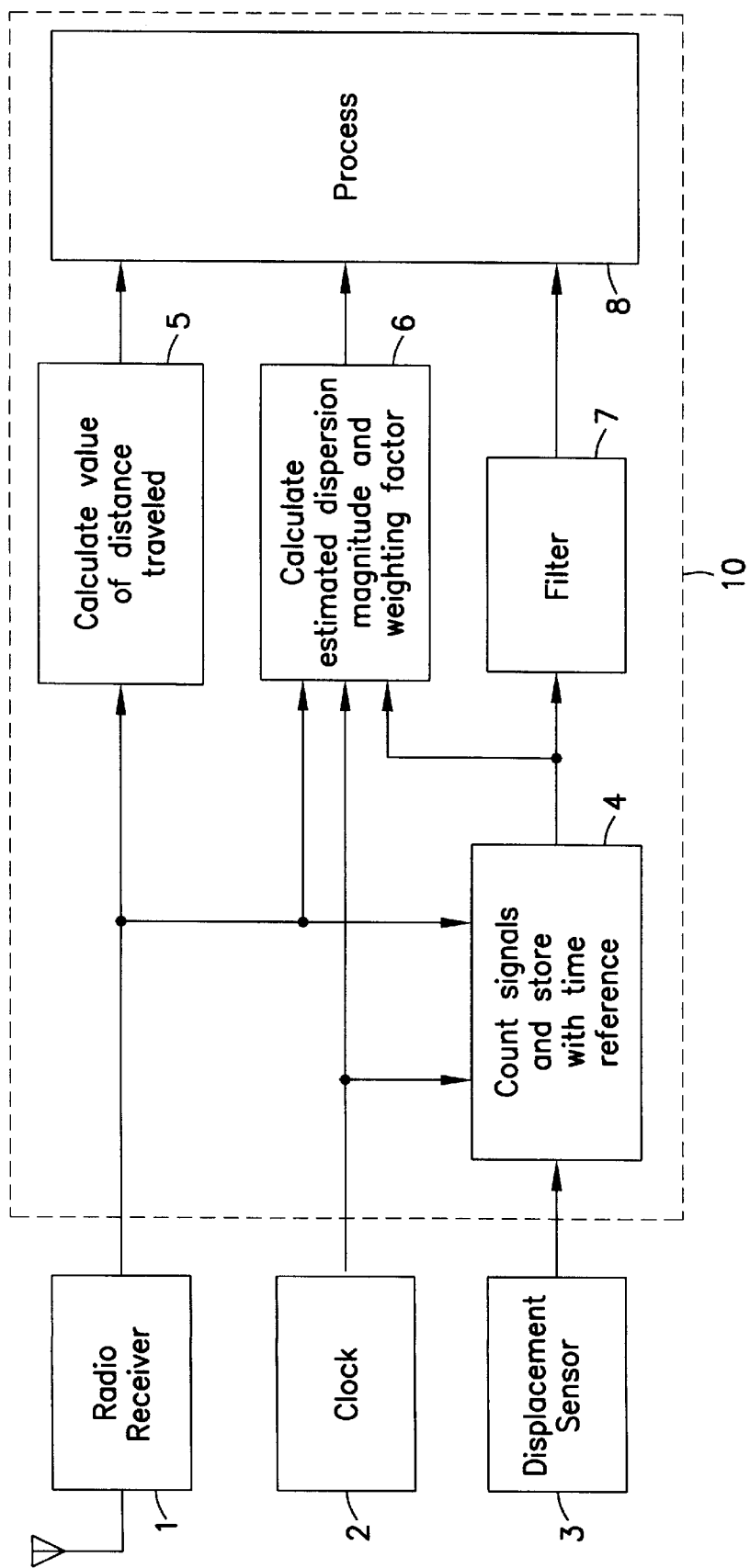
FIG. 1 illustrates a block diagram of an exemplary embodiment.

FIG. 1 illustrates a block diagram of an exemplary embodiment according to the present invention, which will be used to explain its function in more detail. This block diagram may be part of a location system 10, supported on the basis of a digital map, in which the current vehicle position is determined as a function of distance traveled and direction of motion, and displayed on the digital map. Location system 10 is equipped, for example, with a radio receiver 1. Radio receiver 1 is preferably configured as a satellite receiver, and receives the signals of satellites of the Global Positioning System (GPS). Of course other satellite systems, for example, Glonass, may also be used.

In principle, the accuracy for the length measurement, i.e. for the distance traveled, should be very high. An error of, for example, less than 0.5% is desirable, so that, in destination guidance systems in particular, the necessary driving instructions can be output to the driver at the correct time. There arises in this context, however, the problem that the accuracy of the GPS satellite signals is not immediately sufficient for calibration of the displacement sensor, for example an inductive wheel sensor, since the GPS operator e.g., the Department of Defense has artificially degraded the signals. Without this artificial degradation it would be possible, for example using the Doppler effect, to determine the vehicle speed to an accuracy in the range from 0.1 to 0.2 m/s (twice the standard deviation, $2\sigma$. Even this value, however, is still too inaccurate for an accuracy requirement of less than 0.5%, since assuming a speed of 50 km/h (approximately 13.9 m/s) there would already be an error of approximately 1.44%. This error is increased even further by the artificial degradation of the signals to which every civilian GPS user is subject. A further error factor is inaccurate or nonexistent synchronization between the GPS measurement time and the recording of the sensor signals when the vehicle speed is not constant during the measurement time. The result is thus an overall inaccuracy which initially appears unsuitable for calibration of displacement sensor 3.

With the aid of the present invention, however, the GPS signals can nevertheless be used to calibrate displacement sensor 3. The calibration variable of displacement sensor 3 is calculated using the formula $$\frac{\text{distance driven}}{\text{sensor signal}} = \frac{GPS \text{ measurement rate} \times \text{time}}{\text{sensor signals}}$$

where "time" means the sensor signal recording time. For example, for calibration of a measured wheel which supplies m pulses per revolution as its sensor signal, the unit of the desired calibration variable will then be "distance/pulse".

In some preferred embodiments of to the present invention, length calibration of displacement sensor 3, is achieved by repeatedly performing the speed measurements using the satellite signals and the Doppler effect, and determining the individual measured values $x_i$ for the calibration variable, where i is an integer from 1 to n. The resulting mean for the calibration variable x is then calculated with the formula:

$$x = \frac{x_1 + x_2 + x_3 + \ldots + x_n}{n}.$$

The standard deviation of the measured values then decreases, for n measurements and on the assumption that the dispersion of all the measurements is the same, to $$\sigma = \sigma i / \sqrt{n}.$$

If n=100 measurements, for example, the dispersion magnitude of the mean is 1/10 the dispersion of the individual values.

If the dispersion magnitude of all the measured values is not identical, a weighting of the measurements is performed. One indication of the accuracy of the particular calculated calibration variable (distance/pulse) is the geometric dilution of precision (GDOP), which accounts for time errors and satellite geometry. If there is no synchronization between the GPS speed measurement and the sensor signals, an estimate of the constancy of the vehicle speed may be made by, for example, detecting the number of sensor signals per unit time. The more constant the vehicle speed, the less the influence of the absence of synchronization. The magnitude of the vehicle speed also has a considerable influence on the relative error of the distance measurement using GPS.

Mathematical methods are employed to compensate measurements of differing accuracy, each measured value is given a weighting factor p. The weights are inversely proportional to the squares of the mean errors (dispersion):

$$\frac{p_2}{p_1} = \frac{\sigma_1^2}{\sigma_2^2}.$$

Weighting factors $p_1, p_2, \ldots, p_n$ are thus calculated automatically. The weight can be set as $p_1=1$ for any desired measured value (e.g., $x_1$), since the weights are only relative numbers. The other weights follow from the formula above. Once known, the weights are used to determined the arithmetic mean, taking the weighting factors into account. The calibration variable x is thus:

$$x = \frac{p_1 \cdot x_1 + p_2 \cdot x_2 + \ldots p_n \cdot x_n}{p_1 + p_2 + \ldots p_n}.$$

In the example above, measured value $x_1$ with a weight $p_1=1$ is the weight unit. The result for the mean error (i.e., standard deviation, dispersion) of the general arithmetic mean is thus:

$$\sigma = \frac{\sigma_1}{\sqrt{p_1 + p_2 \ldots p_n}} = \frac{\sigma_1}{\sqrt{\sum_{i=1}^{i=n} pi}}$$

In order to reduce the dispersion of the speed measurement obtained using the GPS signals, the calculated vehicle speed is often smoothed in the GPS receiver using, for example, a smoothing filter. To eliminate this effect if the vehicle is not actually moving at a constant speed, either the smoothing, for example, filtering operation is canceled or the sensor signals of the displacement sensor are filtered similarly.

Operation will now be explained in more detail with reference to the exemplary embodiment of FIG. 1. Location system 10 is connected to radio receiver 1, preferably a GPS receiver. Also provided are a clock 2 as timer, and at least one displacement sensor 3. Displacement sensor 3, for example, may be configured as an inductive wheel sensor are known per se. Location system 10 includes, for example a computer, a control program, a main memory, a map memory for a digital road map stored, for example, in a CD-ROM, an input unit (not depicted), and an output unit such as, for example, a display or a loadspeaker.

The speed of the vehicle within a defined measurement time is calculated from the signals received by satellite receiver 1. In item 5, the distance traveled by the vehicle is calculated by multiplying the speed by the measurement time. In addition, in item 4 the signals of displacement sensor 3 are counted and stored with a time reference. Using clock 2 and the reception status of satellite receiver 1, the signals of the displacement sensor are synchronized with those of satellite receiver 1 and stored temporarily. At item 7, the signals of displacement sensor 3 are additionally filtered with a smoothing filter, equivalently to those from satellite receiver 1, so that these signals can be processed similarly to the signals from GPS receiver 1 restoring comparability. The filtered displacement signals of displacement sensor 3 are available for further processing.

An item 6, the estimated dispersion magnitude σ and the weighting factor x for the vehicle speed calculated from satellite receiver 1 are then calculated in order to determine a mean for the individual values. The dispersion magnitude of the distance measurement calculated using satellite receiver 1 is calculated and estimated based on the GDOP, the absolute vehicle speed, and the stability of the vehicle speed. The stability of the vehicle speed is ascertained using the signals of displacement sensor 3, by counting the pulses per unit time. The selected relationship between the dispersion and the weighting factor is stored in memory in order to determine the respective current weighting factors (σ for p=1). The calculated values for the distance traveled from item 5, the dispersion and weighting from item 6, and the synchronized and filtered displacement signals from position 7, are further processed at item 8 such that as measurement proceeds, a statistically optimized calibration value and the standard deviation is calculated. The calculation is accomplished with the procedure described above. By taking into account dispersion values, it is possible to obtain from the plurality of satellite Doppler measurements a very accurate value for the vehicle distance traveled per wheel sensor pulse. The navigation system is thereby capable of calibrating a displacement sensor entirely automatically, i.e. without manual calibration involving a calibration distance.

Since location system 10 already contains a computer, items 4 through 8 are preferably configured in the form of corresponding software routines.

What is claimed is:

1. A method for automatically calibrating a displacement sensor of a vehicle, comprising the steps of:
   counting signals from the displacement sensor for a sequence of respective time periods, the signals from the displacement sensor representing a distance traveled;
   continuously ascertaining speeds of the vehicle via reception of broadcast signals and via the Doppler effect, the ascertained speeds being associated with the sequence of respective time periods;
   forming quotients from products of the ascertained speeds associated with each of the respective time periods, and a number of the signals from the displacement sensor counted in each of the respective time periods;
   multiplying each of the quotients by a respective weighting factor;
   determining a mean from the weighted quotients; and
   calibrating the displacement sensor as a function of the mean.

2. The method according to claim 1, wherein the broadcast signals are from a global positioning system.

3. The method according to claim 1, further comprising the step of:
   correlating and comparing the signals from the displacement sensor with the ascertained speeds of the vehicle.

4. The method according to claim 1, wherein each respective weighting factor of each of the quotients depends on a mean error of the quotient.

5. The method according to claim 1, further comprising the steps of:

calculating each respective weighting factor iteratively; and allocating a fixed value to one respective weighting factor.

6. The method according to claim 5, wherein the fixed value is 1.

7. The method according to claim 5, further comprising the step of:

calculating a ratio between two respective weighting factors from a reciprocal ratio of squares of mean errors of the quotients with which the two respective weighting factors are associated.

8. The method according to claim 1, wherein the mean is calculated by arithmetic averaging of the weighted quotients.

* * * * *